*T. H. Stevens.*

*Sawing Stone.*

Nº 90,969.        Patented Jan. 8, 1869.

Witnesses:        Inventor:
Henry N. Wyggatt      Thomas H. Stevens
James W. Loomis      by N. Crawford
                       atty

N. PETERS, PHOTO-LITHOGRAPHER, WASHINGTON, D.C.

United States Patent Office.

THOMAS H. STEVENS, OF DOVER, NEW YORK.

Letters Patent No. 90,969, dated June 8, 1869.

IMPROVED STONE-SAWING MACHINE.

The Schedule referred to in these Letters Patent and making part of the same.

*To all whom it may concern:*

Be it known that I, THOMAS H. STEVENS, of Dover, in the county of Dutchess, and State of New York, have invented certain new and useful Improvements in Machines for Sawing Stone; and I do hereby declare that the following is a full, clear, and exact description thereof, reference being had to the annexed drawings, making part of this specification, in which—

Figure 1:
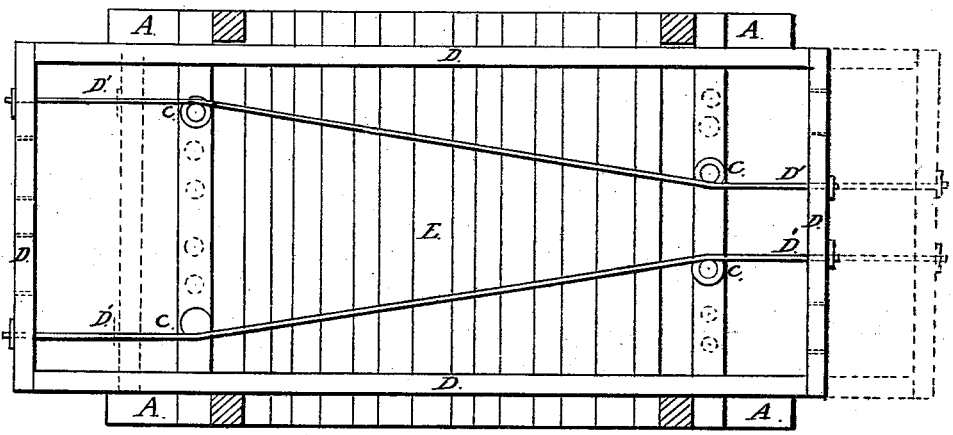

Figure 1 represents a plan view of the machine, and

Figure 2:
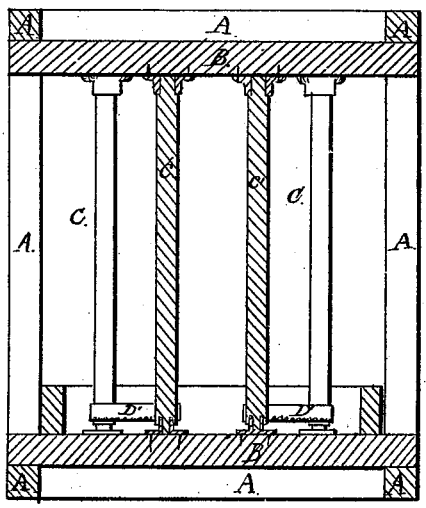

Figure 2, an end view of same.

The object of this invention is to provide a cheap machine for sawing blocks of stone, whose sides are not parallel, but would be tapering, or of less measure, at one end than the other; and It consists of the means used for guiding the saws in the direction in which the sides of such blocks of stone are to be sawed, and in the sawing of the two opposite sides of a tapering block at the same time, and in a tapering form.

To enable others skilled in the art to make and use my invention, I will describe its construction and operation.

In the drawings—

A represents the usual framing of the sawing-machine, which is composed of the sills, posts, guides, and plates, securely attached together in any permanent manner.

B represents the floor-supports and cross-beams, upon which the block to be sawed is placed.

C C are the guide-rollers, and against which the saws D' D' slide and get their direction, so as to saw their necessary taper.

These guide-rollers may be made in various ways, one of which is shown, in fig. 2, in upright sections, at C' C', as they must be constructed to turn around, and not allow the saws to slide upon their sides, in any case.

I prefer to have the rollers made with gudgeons on their ends, and such gudgeons to turn freely in steps or cups, which are fastened to cross-beams and floor-supports B.

At the bottom end of these guide-rollers the gudgeon is turned into the end of the roller, so that, when in place, the outside of the roller sets over and outside of the step, which forms a shield, and protects the gudgeon from the possibility of getting sand and water into the step and cut away the parts; or simple rods, having a sleeve over and around them, and against which the saws will slide, and, as the saws reciprocate, will cause the sleeve to turn upon the rods forming a friction-sleeve, may be used successfully.

D is a common sash-frame, in which the saws D D' are placed, and may be reciprocated by any of the common modes in use.

The saws D' D' are placed as shown in plan view, fig. 1, and must be strained very tight by any known means, and when used in sawing tapering articles, or blocks of marble, the saws, at the larger end of the block, are placed on the outside of the guide-rollers, and, at the smaller end, are placed on the inside of such guide-rollers.

When the saws and guide-rollers are thus arranged, and the sash or frame in which the saws are strained, and in the position shown in fig. 1, by reciprocating the frame D, the saws D' D' will always be on a line drawn from the outside of the roller, at the larger end, to the inner side of the rollers at the smaller end, as shown in said fig. 1.

This forms a machine cheap in construction, practical and successful in its operation, avoiding the many complications and causes of failure in other constructions where so many parts are employed, and are always either wearing away so as to completely destroy their usefulness, or the parts breaking because of the many joints in their construction, while the simplicity of this machine alone would recommend its use wherever it is wanted.

I am aware that machines for sawing tapering blocks of marble or stone have long been in use, and that such machines are generally complicated in their construction, having many more parts that operate to produce the effect desired, hence more liable to get out of order than the machine herein described. Consequently I do not lay any claim to any of the devices, separately, as of my invention, believing them to be old.

What I claim as my invention, and desire to secure by Letters Patent, is—

The combination of the reciprocating frame D, saws D' D', with the four guide-rollers C C C C, all constructed and arranged to operate in the manner and for the purpose set forth.

THOMAS H. STEVENS.

Witnesses:
JOHN S. HOLLINGSHEAD,
HENRY N. MYGATT.